J. D. S. NEWELL.
Apparatus for Starting Street-Railroad Cars.

No. 131,772 — Patented Oct. 1, 1872.

WITNESSES:
H. A. Jenkins
J. C. Hubbell

INVENTOR
J. D. S. Newell

UNITED STATES PATENT OFFICE.

J. D. STOKES NEWELL, OF NEW ORLEANS, LOUISIANA.

IMPROVEMENT IN APPARATUS FOR STARTING STREET-RAILROAD CARS.

Specification forming part of Letters Patent No. 131,772, dated October 1, 1872.

*To all whom it may concern:*

Be it known that I, J. D. STOKES NEWELL, of the city of New Orleans, parish of Orleans and State of Louisiana, have invented a new, useful, and Improved Apparatus for Starting Street-Railroad Cars.

My improvement relates to a very simple mechanical arrangement, through the agency of which the draft animals of a street railroad car may be materially relieved from the burdensome task of starting the cars from a stationary position, the frequent and necessarily oft-repeated operations of which, as experience has proved, so quickly impairs their strength, and render draft animals of street-cars unfit for use. My improvement has for its object the starting of street-railroad cars by means of a combination and arrangement of levers, rods, and cranks, as will be hereinafter more fully described, whereby the power of the draft animals at the moment of starting said cars is multiplied to a considerable extent, and whereby said multiplied power is exerted directly upon the forward axle of the car, and as the wheels are rigidly keyed thereto they will be made to revolve simultaneously therewith. The power of the draft animals thus multiplied is designed to be exerted to the extent of turning the wheels of the car from a quarter to a half of a revolution of said wheels, whereby a sufficient momentum will be imparted to the whole car to enable the draft animals thereof to proceed with their burden with the greatest ease and facility; and I do hereby declare that the following is a full, clear, and exact description of the same, which will enable others skilled in the art to which it appertains to make and use the same, reference being had to the accompanying drawing forming a part of this specification, in which—

Figure 1:
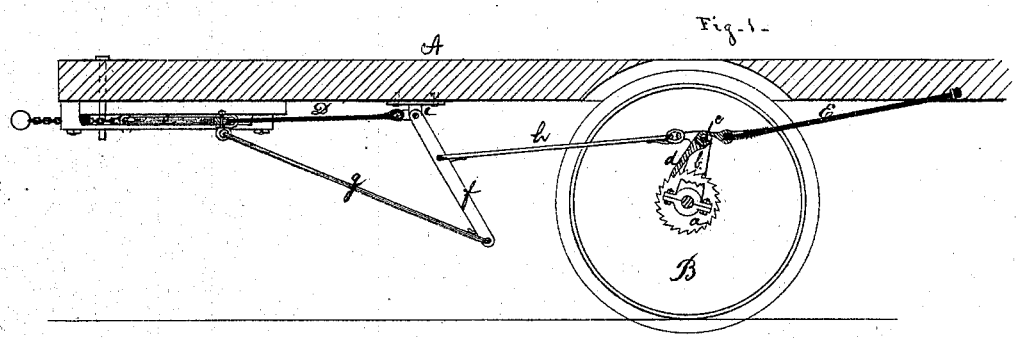
Figure 2:
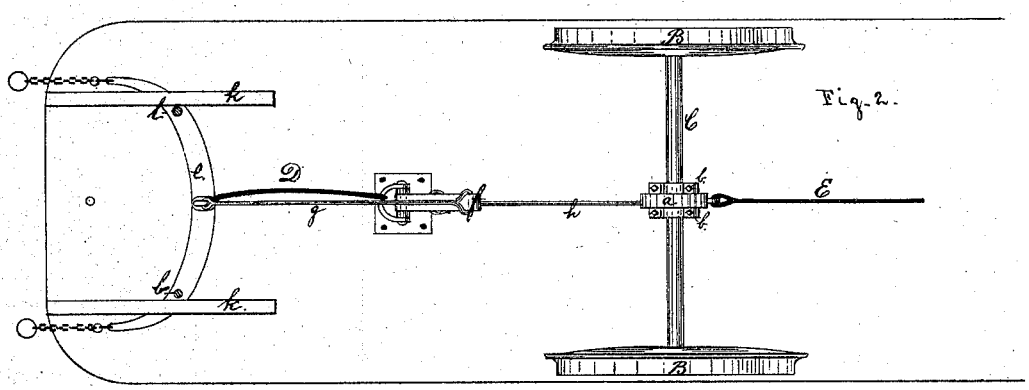

Figure 1 is a longitudinal vertical section in connection with the forward wheels and forward part of the platform of a street-car; and Fig. 2 is a bottom view of the same.

Similar letters of reference indicate corresponding parts of my device represented in both figures.

A is the platform, B the forward wheels, and C the forward axle, of a street car. To the said axle C, and near the center of its length, is securely keyed or otherwise rigidly fixed the ratchet-wheel $a$, and also loosely placed thereon the cranks $b$. Through the outer extremities of the said cranks $b$ is, as will be perceived, passed a bolt, $c$, from which is suspended the pawl $d$, the lower end of which, by its own gravity, drops into the ratchet-wheel $a$ aforesaid. D and E are springs of rubber or of any other suitable material. The spring D serves to draw back, when the draft-animal and car are at rest, the whiffletree, shown at $e$, as well as the draft-chains therewith connected. The spring E serves to draw back, when the draft-animal and car are at rest, the lever $f$ and cranks $b$, as well as the rods $g$ and $h$ therewith connected. The upper end of the said lever $f$ is secured to and hinged upon the drop links or lugs $i$ upon the under side of the platform A, and to the lower extremity of the said lever $f$ is attached the rod $g$, and at a point upon said lever $f$ about one-half the distance of its length from its pivoted or fulcrum point, at the lugs $i$, is attached the rod $h$. To the under side of the platform A aforesaid are suspended the two slide-frames $k$, which subserve the essential purpose of sustaining the whiffletree $e$ and draft-chains connected therewith. The whiffletree $e$ is provided with the pins $l$ which, while they allow of a limited but uninterrupted forward and backward movement of the said whiffletree, prevent its lateral movement, a feature which is important to the successful operation of my device.

Having described my improvement, what I claim and desire to secure by Letters Patent, is the following:

1. The ratchet-wheel $a$ and cranks $b$ having the pawl pivoted thereto, arranged to rotate upon a common axis, in combination with the rods $h$ and $g$ and lever $f$, substantially as herein described, and for the purpose set forth.

2. The slide-frames $k$, in combination with the whiffletree $e$, when the latter is provided with pins $l$, for the purposes set forth.

J. D. S. NEWELL.

Witnesses:
L. J. OLMSTEAD,
H. N. JENKINS.